(12) United States Patent
Nurmi

(10) Patent No.: US 7,345,678 B2
(45) Date of Patent: Mar. 18, 2008

(54) EDITING CHARACTER STRINGS WITH TOUCHSCREEN

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 642 days.

(21) Appl. No.: 10/774,253

(22) Filed: Feb. 6, 2004

(65) Prior Publication Data

US 2004/0246228 A1 Dec. 9, 2004

(30) Foreign Application Priority Data

Dec. 2, 2003 (FI) .................................. 20031758

(51) Int. Cl.
*G09G 5/00* (2006.01)
(52) U.S. Cl. ...................... 345/173; 345/174; 345/175; 370/465
(58) Field of Classification Search ................ 345/173, 345/174, 175; 370/465
See application file for complete search history.

(56) References Cited

U.S. PATENT DOCUMENTS

| | | | |
|---|---|---|---|
| 5,231,698 A | | 7/1993 | Forcier |
| 5,793,360 A | | 8/1998 | Fleck et al. |
| 5,982,351 A | | 11/1999 | White et al. |
| 5,982,876 A | | 11/1999 | Albesa |
| 6,470,027 B1 | * | 10/2002 | Birrell, Jr. .................. 370/465 |
| 6,643,824 B1 | | 11/2003 | Bates et al. |
| 6,835,013 B2 | * | 12/2004 | Dunn et al. ............... 400/615.2 |
| 2004/0158429 A1 | * | 8/2004 | Bary et al. .................. 702/183 |

FOREIGN PATENT DOCUMENTS

| | | | |
|---|---|---|---|
| EP | 0 597 795 A1 | | 5/1994 |
| JP | 02-204848 A | * | 8/1990 |
| KR | 10-0417639 | | 1/2004 |

OTHER PUBLICATIONS

Burgmann, Gerhard, "BVI: Edit Command," Retrieved on Mar. 16, 2005 from the internet: htt://bvi.sourceforge.net/edit.html, Sep. 30, 1999, 2 pages.
Printed from the internet Jul. 26, 2004, "Command Overview. Edit Movements," BVI: Edit Commands, http://bvi.sourceforge.net/edit.html, 3 pages.

* cited by examiner

*Primary Examiner*—Richard Hjerpe
*Assistant Examiner*—Leonid Shapiro
(74) *Attorney, Agent, or Firm*—Hollingsworth & Funk, LLC

(57) ABSTRACT

A method of editing a character string displayed on a touchscreen with an indicator means. A character string comprising a plurality of characters is displayed on the touchscreen. The character string is edited in response to an indication made with the indicator means such that the characters after the indication point are deleted from the character string. The character string may be a network address displayed in an address field of a browser program, whereby the loading of the network address according to the edited character string is automatically initiated by the browser program in response to the editing of the character string.

27 Claims, 2 Drawing Sheets

EDITING CHARACTER STRINGS WITH TOUCHSCREEN

FIELD OF THE INVENTION

The invention relates to the use of touchscreen devices provided with an indicator means and particularly to editing character strings, such as network addresses, with the indicator means.

BACKGROUND OF THE INVENTION

The number of tasks carried out by a wireless terminal, such as a mobile station, has considerably increased as a result of advances in the mobile telecommunication technology. A mobile station is not used only for calls, but a mobile station can also be used to process and display information in an increasingly versatile manner. One of the most desirable properties of a wireless terminal is the ability to use Internet services, such as email and graphic www pages. Many other small portable terminals (e.g. PDA devices, Personal Digital Assistant) also comprise means, e.g. a WLAN card or a wired connection, for setting up an Internet connection.

Touchscreens are increasingly used in both PDA devices and mobile stations. To use the device, different selection elements (icons) are displayed on the screen, and touching them activates functions associated with the selection element. Many functions can be used by selecting suitable alternatives from menus and activating the desired function or setting by touching that particular point on the screen. However, the use of some applications is subject to text being entered via the touchscreen. For text entry, the keys of a QWERTY keyboard can be modelled onto a touchscreen (also known as a virtual keyboard). In addition to modelled keys or as an alternative entry mechanism, handwriting identification is also often used. The small size of the screen and the simultaneous display of several selection elements on the screen results in the elements on displayed on the screen being substantially small. Due to the small keys and handwriting identification, a touchscreen is generally used by means of a small writing device, i.e. a stylus, e.g. a small pen-shaped object.

This often complicates text entry, and particularly the editing of text existing on the screen. For example, editing the network address (URL address) of an Internet browser into the desired form is often laborious and cumbersome. Internet browsers generally use predictive text entry, i.e. when the user of the device starts to write a new network address in the address field of the browser, the browser's history data are searched for such a network address that, at least as regards the beginning of the address, comprises the same character string as the character string of the network address entered up to that point by the user. The browser program shows the network address found in the history data in the address field suggesting it for use to the user either as such or allowing the user to edit the character string in a suitable manner to generate the desired address.

A solution is known from what are known as palm-size computers (e.g. Palm™ OS4) for editing a character string, such as an Internet address, displayed on a screen, wherein the user first selects the part of the character string to be deleted by pointing ('painting') said characters with a stylus, after which the user has to either depress the 'backspace' key of the virtual keyboard or enter a symbol indicating the corresponding purpose in a handwriting entry field. The part of the character string selected by means of the backspace function is deleted. Furthermore, in said known solution, if the edited character string is the network address in the address field of the browser program, the browser program has to be separately activated by depressing the stylus if, the browser program is to start loading the network address defined by the edited character string.

In other words, to load a new network address, the user has to perform three separate tasks with the stylus in order for the browser program to start loading. From the point of view of usability, this is generally considered very laborious and slow. Accordingly, there is need for a simpler way of editing a character string on a touchscreen.

BRIEF DESCRIPTION OF THE INVENTION

A method and equipment for implementing the method are now provided for simplifying the editing of a character string and the initiation of applications in devices comprising a touchscreen. As different aspects of the invention are provided a method, an electronic device and a computer program, which are characterized in what is stated in the independent claims. Preferred embodiments of the invention are described in the dependent claims.

The basic idea of the invention is to edit a character string comprising a plurality of characters displayed on a touchscreen with a indicator means by indicating the character string with the indicator means and by editing the character string in response to an indication performed with the indicator means such that the characters after the indication point are deleted from the character string.

In accordance with an embodiment of the invention, said character string is a network address displayed in the address field of a browser program.

In accordance with an embodiment of the invention, loading the network address according to the edited character string is initiated automatically by said browser program in response to the editing of the character string.

In accordance with an embodiment of the invention, said character string is displayed in the address field of the browser program based on predictive address entry.

In accordance with an embodiment of the invention, the touchscreen is configured to identify the duration of the indication in relation to a predetermined limit value, whereby said automatic loading of the network address is initiated in response to the duration of the indication exceeding the predetermined limit value.

In accordance with an embodiment of the invention, the touchscreen is configured to identify the direction of movement of the indication in relation to a predetermined limit value, whereby said automatic loading of the network address is initiated in response to the direction of movement being within the limits set by the predetermined limit value. In this case, in accordance with an embodiment of the invention, the indication is arranged to be performed as a substantially perpendicular back and forth movement between two characters comprised by the character string.

In accordance with an embodiment of the invention, said automatic loading of the network address is initiated in response to the indicator means being released from contact with the touchscreen.

An advantage of the method and device of the invention is that the user is able to use one indication function of the indicator means to edit the character string displayed on the screen, and in some embodiments also to initiate a function associated with the application, such as loading a new network page. A further advantage is that the user does not need to open the text entry function to edit the character string displayed on the screen. The method provides the user with an intuitive manner of editing the character string displayed on the screen. In accordance with an embodiment of the invention, the editing does not take place until the user detaches the indicator means from the touchscreen. The advantage here is that the user is able to check the correct indication point as long as the indicator means is in contact with the text field comprised by the touchscreen. In addition, when desired, the user is able to preferably change the indication point by gliding the indicator means along the character string. This speeds up the use of the device and reduces erroneous selections.

BRIEF DESCRIPTION OF THE FIGURES

In the following, preferred embodiments of the invention will be described in detail with reference to the accompanying drawings, in which.

DETAILED DESCRIPTION OF THE INVENTION

Figure 1:
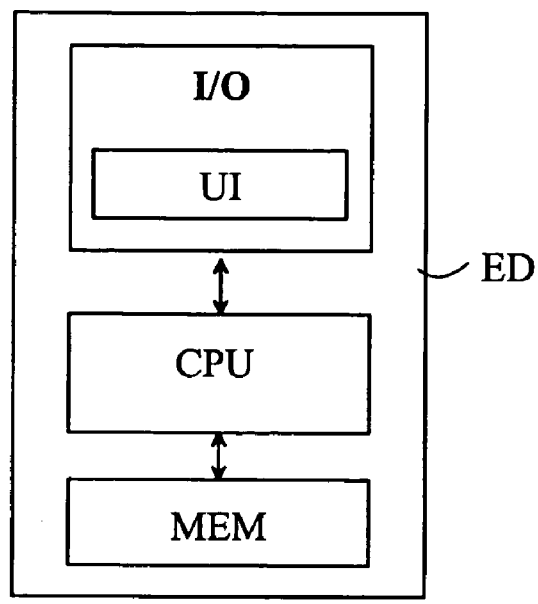
FIG. 1 is a block-diagram of an electronic device to which the invention can be applied.

FIG. 1 shows a block diagram of an electronic device (ED) comprising a touchscreen, the device being for instance a wireless mobile station or a PDA device to which the invention is applicable.

The electronic device (ED) comprises a central processing unit (CPU), memory (MEM) and an I/O system (I/O). All necessary information is stored in the memory (MEM) of the device. The memory (MEM) comprises a read-only memory partition, which may be ROM memory, for example, and a write memory partition, which may be composed of a RAM (Random Access Memory) and/or FLASH memory, for example. The device communicates via the I/O system (I/O) with other devices, a network and a user, for example. The user interface (UI), which is part of the I/O system (I/O), comprises the necessary interface for communication with the user, such as a screen, keys, a loudspeaker and/or a microphone, for example. The screen of the device is a touchscreen. The data received from the different components of the device are transferred to the central processing unit (CPU), which processes the received data in the desired manner.

In FIG. 1, the electronic device (ED) is illustrated as an integrated device comprising all necessary components in one unit. It is, however, possible to implement the electronic device as a device system comprising a plurality of component units functionally connected to each other. Thus, for example the screen, the microphone/loudspeaker and at least a part of the memory can be implemented as separate units, which are connected to rest of the device system either by wired connection or wirelessly, for example via Bluetooth connection. Accordingly, it is obvious for a skilled man that any component of the device system can be implemented as a separate unit.

The invention is applicable for use substantially with all touchscreen types, but the touchscreen type employed is not as such essential as regards the implementation of the invention. The implementation of the touchscreen may be based on one of the following technologies, for example: various electronic methods, infrared-based technology, sound wave-based technology or pressure pickup. Some touchscreen types require a stylus, into which electronics are built, a resonance circuit, for example. Such a screen requires said stylus to work and cannot be used by indicating with a pen, for example.

Figure 2:
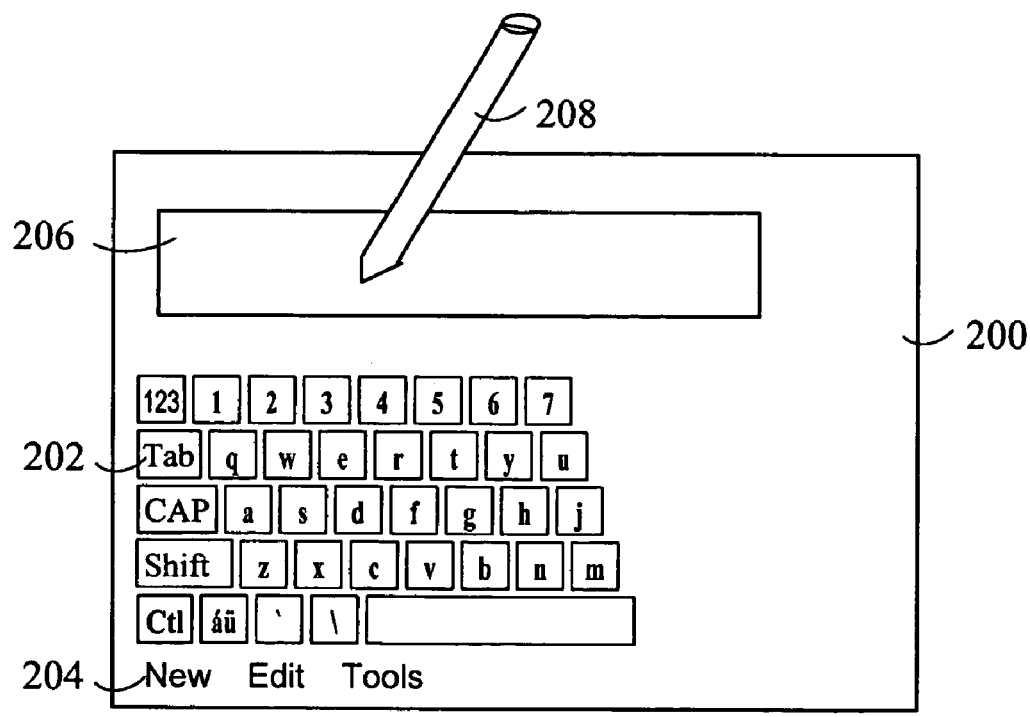
FIG. 2 shows a typical user device of a touchscreen of a portable device in a simplified manner.

FIG. 2 shows in a simplified manner the user interface of a small-sized, typically portable device comprising a touchscreen. The screen 200 of the device is a touchscreen, in which some keys 202 of the QWERTY keyboard and function keys 204 are modelled at the lower edge of the screen. Typically, the screen or the application used in the device comprises a text field 206 for entering text or editing text existing in the text field based on either handwriting identification or by means of a keyboard. Both alternatives are based on the use of an indicator means, i.e. a stylus 208. By activating a letter key 202, i.e. selecting it with the stylus 208, the user is able to enter letters in the device via the keyboard, and thus write text. In handwriting identification, the user writes text freehand in a field comprised by the touchscreen 200, the field being the same as the text field 206 displaying the actual text or a separate write field into which characters are written freehand and then, after identification, displayed in the text field 206.

A method for editing text displayed on a screen and for activating a related application according to some embodiments is illustrated next with reference to FIGS. 3a to 3c. The starting point in this example is an Internet browser program comprising predictive address entry functionality, known per se.

Figure 3A:
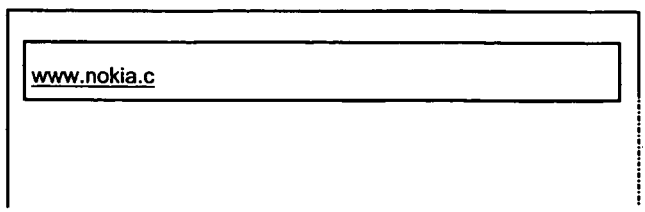
FIGS. 3a to 3c show an example of the editing of a character string according to the invention.
Figure 3B:
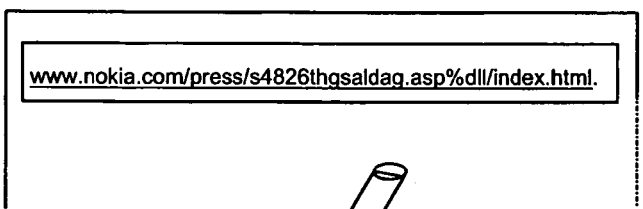

In FIG. 3a, the user enters, in the address field of the browser program, the initial part of the address of the network page he wants to load, either by handwriting identification or via a keyboard. In this example, the user writes www.nokia.c. The predictive address entry functionality of the browser program finds at least one suitable address from the history data of the browser program, and it typically suggests the last-used address. In this example, the browser program suggests, as the last-used address, the address www.nokia.com/press/s4826thgsaldag.asp%dll/index.html shown in FIG. 3b. However, this network page is not the one the user wants to load, and it is thus necessary to edit the character string comprised by the address.

Figure 3C:
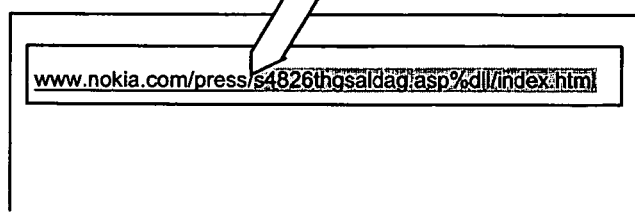

The user wants to load the network page www.nokia.com/press/, whereby, in accordance with the invention, the user uses the indicator means to depress the address www.nokia-.com/press/s4826thgsaldag.asp%dll/index.html of the address field of the browser program at the point after the word press/ in accordance with FIG. 3c. Then, the last part of the address after the word press/ can be preferably displayed fleetingly for instance on a darkened background, after which it is automatically deleted. The delay between the indication and the deletion is preferably sufficiently long for the user to have time to detect if he pressed the address character string at the correct point. Displaying the part of the character string to be deleted on a darkened background or in some other manner intuitive for the user helps the user preferably to detect if the marked point of the character string is correct.

In accordance with an embodiment, editing the network address of a browser program by deleting part of it from the end also automatically initiates the loading of the page according to the new network address. This allows the user to use one indication function of the indicator means to edit the character string displayed on the screen and to initiate the loading of a new network page.

In accordance with an embodiment, the touchscreen of the device is configured to define the duration in time of the contact of the indicator means and to compare it with a limit value stored in a memory. A contact longer in time than the limit value activates a function associated therewith, such as the deletion of the end of the character string or the loading of a network page according to the new address associated with the deletion. In association with this, in accordance with an embodiment, the activation of the function does not take place until the user detaches the indicator means from the touchscreen. This allows the user to check the correct indication point as long as the indicator means is in contact with the text field comprised by the touchscreen. In addition, when desired, the user is able to preferably change the indication point by gliding the indicator means along the character string.

In accordance with an embodiment, the touchscreen of the device is configured to define the direction of movement of the indicator means and to compare it with a limit value stored in a memory. In this case, the indication point can be marked for instance with a substantially perpendicular movement of the indicator means. In accordance with an embodiment, the perpendicular movement is to be performed back and forth. The perpendicularity of the movement can be determined from the derivates of the changes of the contact points of the indicator means, allowing the limit value to be set for instance such that the angle of change is not to exceed for instance 10 degrees in relation to the side edge of the touchscreen. The perpendicular movement should preferably be performed between the characters at which the end of the character string is to be deleted, which is also for the user an intuitive manner of 'sawing' the character string in two.

In the above, the invention was described by way of example particularly in association with the editing of a network address of an Internet browser. However, the invention is not limited hereto, but it can be applied to the editing of any character string in a device provided with a touchscreen, whereby the application wherein the character string is edited can also be other than a browser program. The editing of a character string according to the invention can be applied for instance to cell definitions in a spreadsheet program and related calculation formulas, whereby the use of the character string editing of the invention can preferably automatically activate the update according to the changed cell definitions in the table.

Furthermore, when the invention is applied to the editing of a network address of an Internet browser, the invention can also be applied to browsers that do not support predictive address entry. In this case, the network address is edited based on the address in the address field of the browser at each particular time.

Figure 4:
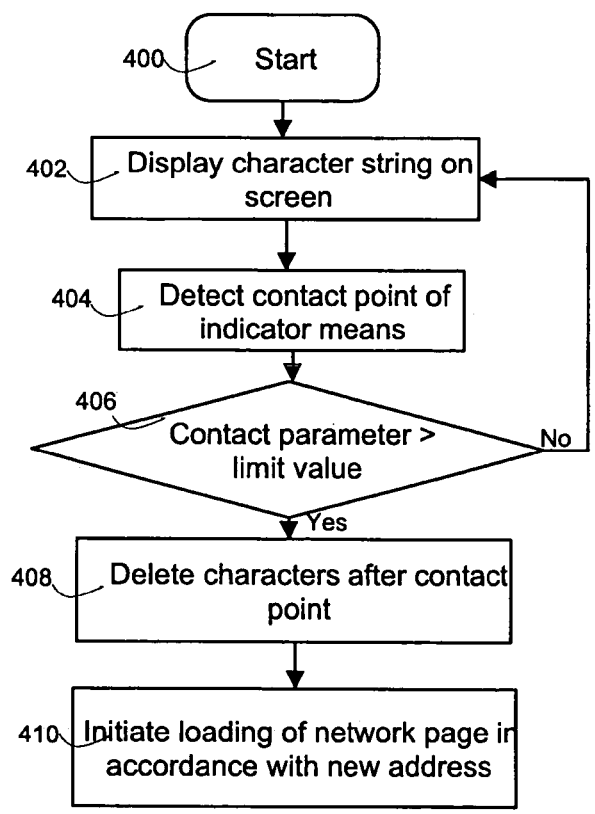
FIG. 4 is a flow diagram of a method according to some embodiments of the invention of editing a character string in association with an Internet browser.

FIG. 4 illustrates, by means of a flow diagram, some of the above-described embodiments when the address field of an Internet browser is edited in accordance with the invention. In the example of FIG. 4, the starting point (400) is a situation where a network address displayed on a screen (402) is defined in the address field. The network address can be an address suggested by the predictive address entry of the browser or it can be the address of the network page last loaded by the user. From the point of view of the application (Internet browser) used via the touchscreen, the process proceeds to the detection of a contact of an indicator means (stylus) (404).

In accordance with an embodiment described above, the application program determines the contact parameter of the indicator means via the touchscreen, such as the duration in time of the contact, and compares it with a preset limit value (406). If the duration of the contact is not sufficiently long (shorter than the limit value), the same network address continues to be displayed on the screen (402). If again the duration in time of the contact is at least as determined by the limit value, the characters after the indication point are deleted from the character string of the network address (408). The contact parameter of the indicator means can also be for instance a value determining the direction of movement of the contact, the value being compared with the limit value stored in the memory, whereby the contact movement should be sufficiently perpendicular, for example, in order for the characters after the indication point to be deleted from the character string of the network address (408). The browser program then automatically initiates the loading of the network address according to the edited character string (410).

The functionality of the invention can be implemented in a portable terminal, such as a mobile station, comprising a touchscreen, preferably as a computer program, which, when executed in the central processing unit CPU, makes the terminal perform tasks according to the invention. The computer program can be most preferably implemented as a plug-in to be loaded into a terminal or an application program. The functions of the computer program SW can be divided into several separate software components communicating with each other. The computer program may be stored in any memory means, e.g. the hard disk of a PC or a CD-ROM, from which it can be loaded into the memory MEM of the mobile station MS. The computer program may also be loaded via a network for instance by using the TCP/IP protocol stack. An alternative is to use hardware solutions or a combination of hardware and software solutions to implement the inventive means.

Accordingly, the computer program SW comprises at least a computer program code section for editing a character string in response to an indication performed with an indicator means such that the characters after the indication point are deleted from the character string.

In accordance with an embodiment, the computer program product is a browser program or a plug-in thereof to be loaded into a terminal, and said character string is a network address displayed in the address field of the browser program, whereby the computer program product comprises a computer program code section for initiating the loading of the network address according to the edited character string by said browser program automatically in response to the editing of the character string.

It is obvious to a person skilled in the art that as technology advances, the basic idea of the invention can be implemented in a variety of ways. The invention and its embodiments are thus not limited to the above examples, but may vary within the claims.

The invention claimed is:

1. A method of editing a character string displayed on a touchscreen with an indicator means, the method comprising:
displaying, on the touchscreen, at least one character string comprising a plurality of characters;
identifying the duration of an indication made with the indicator means in relation to a predetermined limit value; and
editing the character string in response to the duration of the indication exceeding the predetermined limit value such that the characters after the indication point are deleted from the character string.

2. A method as claimed in claim 1, wherein
said character string being a network address displayed in an address field of a browser program.

3. A method as claimed in claim 2, further comprising
initiating automatically the loading of the network address according to the edited character string by said browser program in response to the editing of the character string.

4. A method as claimed in claim 2, further comprising
displaying said character string in the address field of the browser program based on predictive address entry.

5. A method as claimed in claim 3, further comprising
initiating said automatic loading of the network address in response to the duration of the indication exceeding the predetermined limit value.

6. A method as claimed in claim 5, further comprising
initiating said automatic loading of the network address in response to the indicator means being released from contact with the touchscreen.

7. An electronic device comprising:
a touchscreen, on which touchscreen the device is configured to display at least one character string comprising a plurality of characters;
means for detecting an indication performed with the indicator means on the touchscreen wherein the touchscreen is configured to identify the duration of the indication in relation to a predetermined limit value; and
means for editing the character string in response to the duration of the indication exceeding the predetermined limit value such that the characters after the indication point are deleted from the character string.

8. A device as claimed in claim 7, wherein
the device comprises a browser program, said character string being a network address displayed in an address field of a browser program.

9. A device as claimed in claim 8, wherein
the device is configured to control the browser program to automatically initiate the loading of the network address according to the edited character string by said browser program in response to the editing of the character string.

10. A device as claimed in claim 8, wherein
said character string is arranged to be displayed in the address field of the browser program based on predictive address entry.

11. A device as claimed in claim 9, wherein
the device is configured to initiate said automatic loading of the network address in response to the duration of the indication exceeding the predetermined limit value.

12. A device as claimed in claim 11, wherein
the device is configured to initiate said automatic loading of the network address in response to the indicator means being released from contact with the touchscreen.

13. An electronic device system comprising a plurality of component units functionally connected to each, said component units comprising:
a touchscreen, on which touchscreen the device is configured to display at least one character string comprising a plurality of characters;
means for detecting an indication performed with the indicator means on the touchscreen wherein the touchscreen is configured to identify the duration of the indication in relation to a predetermined limit value; and
means for editing the character string in response to the duration of the indication exceeding the predetermined limit value such that the characters after the indication point are deleted from the character string.

14. A computer program product, which, when loaded into an electronic device, is arranged to control at least one character string comprising a plurality of characters to be displayed on a touchscreen of the device, the computer program product comprising
a computer program code section for editing the character string in response to the duration of an indication exceeding a predetermined limit value such that the characters after the indication point are deleted from the character string.

15. A computer program product as claimed in claim 14, wherein
the computer program product is a browser program or a plug-in thereof to be loaded into a terminal, and said character string is a network address displayed in the address field of the browser program, whereby the computer program product further comprises
a computer program code section for initiating the loading of the network address according to the edited character string by said browser program automatically in response to the editing of the character string.

16. A method of editing a character string displayed on a touchscreen with an indicator means, the method comprising:
displaying, on the touchscreen, at least one character string comprising a plurality of characters;
identifying the direction of movement of an indication made with the indicator means in relation to a predetermined limit value; and
editing the character string in response to the direction of movement of the indication being within the limits set by the predetermined limit value such that the characters after the indication point are deleted from the character string.

17. A method as claimed in claim 16, wherein
said character string being a network address displayed in an address field of a browser program.

18. A method as claimed in claim 17, further comprising
initiating automatically the loading of the network address according to the edited character string by said browser program in response to the editing of the character string.

19. A method as claimed in claim 18, further comprising
initiating said automatic loading of the network address in response to the direction of movement of the indication being within the limits set by the predetermined limit value.

20. A method as claimed in claim 19, further comprising
initiating said automatic loading of the network address in response to the indicator means being released from contact with the touchscreen.

21. A method as claimed in claim 16, further comprising
performing the indication as a substantially perpendicular back and forth movement between two characters comprised by the character string.

22. An electronic device comprising:
a touchscreen, on which touchscreen the device is configured to display at least one character string comprising a plurality of characters;

means for detecting an indication performed with the indicator means on the touchscreen wherein the touchscreen is configured to identify the direction of movement of the indication in relation to a predetermined limit value; and means for editing said character string in response to the direction of movement of the indication being within the limits set by the predetermined limit value such that the characters after the indication point are deleted from the character string.

23. A device as claimed in claim 22, wherein the device comprises a browser program, said character string being a network address displayed in an address field of a browser program.

24. A device as claimed in claim 23, wherein the device is configured to control the browser program to automatically initiate the loading of the network address according to edited character string by said browser program in response to the editing of the character string.

25. A device as claimed in claim 24, wherein the device is configured to initiate said automatic loading of the network address in response to the direction of movement of the indication being within the limits set by the predetermined limit value.

26. A device as claimed in claim 25, wherein the device is configured to initiate said automatic loading of the network address in response to the indicator means being released from contact with the touchscreen.

27. A device as claimed in claim 22, wherein the touchscreen is configured to identify the indication, which is performed as a substantially perpendicular back and forth movement between two characters comprised by the character string.

* * * * *